United States Patent
Tanaka et al.

(10) Patent No.: US 11,319,403 B2
(45) Date of Patent: May 3, 2022

(54) POLYURETHANE RESIN COMPOSITION, POLYURETHANE RESIN, MOLDED ARTICLE, FIBER REINFORCED PLASTIC, AND METHOD FOR PRODUCING FIBER REINFORCED PLASTIC

(71) Applicant: MITSUI CHEMICALS, INC., Tokyo (JP)

(72) Inventors: Toshihiro Tanaka, Sodegaura (JP); Hiroshi Kanayama, Sodegaura (JP); Minoru Watanabe, Sodegaura (JP); Hiroki Inoue, Sodegaura (JP); Junji Saito, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 128 days.

(21) Appl. No.: 16/758,170

(22) PCT Filed: Nov. 7, 2018

(86) PCT No.: PCT/JP2018/041294
§ 371 (c)(1),
(2) Date: Apr. 22, 2020

(87) PCT Pub. No.: WO2019/093358
PCT Pub. Date: May 16, 2019

(65) Prior Publication Data
US 2020/0308336 A1    Oct. 1, 2020

(30) Foreign Application Priority Data

Nov. 13, 2017 (JP) ............................. JP2017-218125
Jun. 5, 2018 (JP) ............................. JP2018-107380

(51) Int. Cl.
| | | |
|---|---|---|
| C08G 18/76 | (2006.01) | |
| C08G 18/22 | (2006.01) | |
| C08G 18/32 | (2006.01) | |
| C08G 18/48 | (2006.01) | |
| C08J 5/04 | (2006.01) | |
| C08G 18/08 | (2006.01) | |
| C08G 18/72 | (2006.01) | |
| C08G 18/75 | (2006.01) | |
| C08G 18/79 | (2006.01) | |

(Continued)

(52) U.S. Cl.
CPC ....... *C08G 18/7657* (2013.01); *C08G 18/089* (2013.01); *C08G 18/222* (2013.01); *C08G 18/225* (2013.01); *C08G 18/246* (2013.01); *C08G 18/3206* (2013.01); *C08G 18/4825* (2013.01); *C08G 18/4845* (2013.01); *C08G 18/724* (2013.01); *C08G 18/725* (2013.01); *C08G 18/757* (2013.01); *C08G 18/7664* (2013.01); *C08G 18/797* (2013.01); *C08J 5/042* (2013.01); *C08J 5/043* (2013.01);
(Continued)

(58) Field of Classification Search
CPC .............. C08G 18/7657; C08G 18/222; C08G 18/3206; C08G 18/4845; C08G 18/089; C08G 18/225; C08G 18/246; C08G 18/4825; C08G 18/724; C08G 18/725; C08G 18/757; C08G 18/797; C08G 18/7664; C08K 5/3432; C08J 5/042; C08J 5/043; C08J 5/046; C08J 2375/08
See application file for complete search history.

(56) References Cited

U.S. PATENT DOCUMENTS

| 5,274,114 A | 12/1993 | Weider et al. | |
|---|---|---|---|
| 2004/0143085 A1* | 7/2004 | Fukaya | ................ C08G 18/831 528/48 |

(Continued)

FOREIGN PATENT DOCUMENTS

| JP | S4830748 A | 4/1973 |
|---|---|---|
| JP | H02145617 A | 6/1990 |

(Continued)

OTHER PUBLICATIONS

International Search Report (PCT/ISA/210) dated Feb. 12, 2019, by the Japanese Patent Office as the International Searching Authority for International Application No. PCT/JP2018/041294, and an English translation of the International Search Report.

(Continued)

*Primary Examiner* — Rabon A Sergent
(74) *Attorney, Agent, or Firm* — Buchanan, Ingersoll & Rooney PC

(57) ABSTRACT

The polyurethane resin composition contains, a polyisocyanate component containing p-MDI, a polyol component, an organic metal catalyst, and a reaction retardant represented by general formula (1) below, wherein the mole ratio of the reaction retardant relative to 1 mol of the organic metal catalyst is 0.50 or more and 2.50 or less. (in general formula (1), A represents an aliphatic ring or an aromatic ring, $R^1$ represents a hydrocarbon group composing ring A, $R^2$ represents an aliphatic hydrocarbon group bonded to ring A. $R^3$ represents a hydrogen atom or alkyl group bonded to nitrogen atom included in ring A. $R^1$ represents a hydrogen atom or carboxyl group bonded to ring A. m is 1 or 2, n is 0 or 1, and total of n and no is 2 or less.)

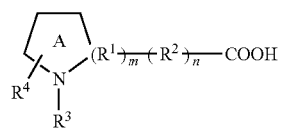

(1)

16 Claims, No Drawings

(51) Int. Cl.
*C08G 18/24* (2006.01)
*C08K 5/3432* (2006.01)

(52) U.S. Cl.
CPC .......... *C08J 5/046* (2013.01); *C08J 2375/08* (2013.01); *C08K 5/3432* (2013.01)

(56) References Cited

U.S. PATENT DOCUMENTS

| | | | |
|---|---|---|---|
| 2017/0152343 A1* | 6/2017 | Gunther | C08G 18/7621 |
| 2017/0174817 A1* | 6/2017 | Gunther | C08G 18/2081 |
| 2018/0044463 A1* | 2/2018 | Gunther | C08J 18/6688 |
| 2018/0194889 A1* | 7/2018 | Gunther | C08G 18/7671 |
| 2018/0208708 A1 | 7/2018 | Kanayama et al. | |

FOREIGN PATENT DOCUMENTS

| | | |
|---|---|---|
| JP | H0559307 A | 3/1993 |
| JP | H05105661 A | 4/1993 |
| WO | 2017014178 A1 | 1/2017 |

OTHER PUBLICATIONS

Written Opinion (PCT/ISA/237) dated Feb. 12, 2019, by the Japanese Patent Office as the International Searching Authority for International Application No. PCT/JP2018/041294.

Notification Concerning Transmittal of International Preliminary Report on Patentability and International Preliminary Report on Patentability (Forms PCT/IB/326, PCT/ISA/237, PCT/IB/338, and PCT/IB/373) with English translation thereof dated May 28, 2020, by the International Bureau of WIPO for International Patent Application PCT/JP2018/041294. (15 pages).

\* cited by examiner

POLYURETHANE RESIN COMPOSITION, POLYURETHANE RESIN, MOLDED ARTICLE, FIBER REINFORCED PLASTIC, AND METHOD FOR PRODUCING FIBER REINFORCED PLASTIC

TECHNICAL FIELD

The present invention relates to a polyurethane resin composition, polyurethane resin, a molded article, fiber reinforced plastic, and a method for producing fiber reinforced plastic.

BACKGROUND ART

Conventionally, it has been known that a polyurethane resin composition containing a polyisocyanate component and a polyol component is injected into a preheated mold and cured to produce a polyurethane molded article having a desired shape. For such a polyurethane resin composition, it is required to ensure pot life (gel time), during which it can be sufficiently fluid in the mold.

For such a polyurethane resin composition, for example, Patent Document 1 has proposed a rigid polyurethane resin composition containing a polyisocyanate component containing polyphenylmethane polyisocyanate and alicyclic polyisocyanate, and a polyol component, and in the polyisocyanate component, the ratio of the alicyclic polyisocyanate-derived isocyanate group relative to a total amount of the polyphenylmethane polyisocyanate-derived isocyanate group and the alicyclic polyisocyanate-derived isocyanate group is 10 to 70 mol % (for example, see Patent Document 1).

CITATION LIST

Patent Document

Patent Document 1: WO2017/014178

SUMMARY OF THE INVENTION

Problem to be Solved by the Invention

However, with the above-described rigid polyurethane resin composition in Patent Document 1, depending on the conditions for formation such as the preheating temperature of the mold, flowability cannot be ensured in the mold sufficiently, and formation deficiencies may be caused. Thus, adding a reaction retardant to the rigid polyurethane resin composition to improve pot life of the rigid polyurethane resin composition has been examined.

However, adding the reaction retardant to the rigid polyurethane resin composition decreases reactivity between the polyisocyanate component and the polyol component, and therefore there are disadvantages in that the time needed for curing of the rigid polyurethane resin composition becomes longer (curing time). As a result, there are disadvantages in that it takes longer time to produce a polyurethane molded article, and production efficiency of the polyurethane molded article decreases.

Thus, the present invention provides a polyurethane resin composition that can improve pot life and decrease curing time; polyurethane resin; a molded article; fiber reinforced plastic; and a method for producing fiber reinforced plastic.

Means for Solving the Problem

The present invention [1] includes a polyurethane resin composition containing a polyisocyanate component containing polyphenylmethane polyisocyanate, a polyol component, an organic metal catalyst, and a reaction retardant represented by general formula (1) below, wherein the mole ratio of the reaction retardant relative to 1 mol of the organic metal catalyst is 0.50 or more and 2.50 or less.

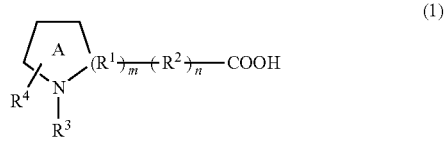

(in general formula (1), A represents an aliphatic ring or an aromatic ring. $R^1$ represents a hydrocarbon group composing ring A. $R^2$ represents an aliphatic hydrocarbon group bonded to ring A. $R^3$ represents a hydrogen atom or alkyl group bonded to nitrogen atom included in ring A provided that $R^3$ does not exist when ring A is a six-membered aromatic ring. $R^4$ represents a hydrogen atom or carboxyl group bonded to ring A. m is 1 or 2, n is 0 or 1, and total of n and m is 2 or less.)

The present invention [2] includes the polyurethane resin composition described in [1] above, wherein the reaction retardant is represented by general formula (2) below.

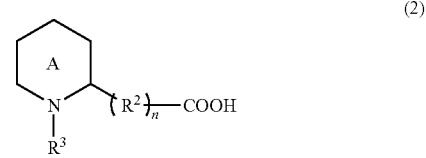

(in general formula (2), A, $R^2$, $R^3$, and n are the same as A, $R^2$, $R^3$, and n in the above-described general formula (1))

The present invention [3] includes the polyurethane resin composition described in [2] above, wherein the reaction retardant is picolinic acid.

The present invention [4] includes the polyurethane resin composition described in any one of the above-described [1] to [3], wherein the reaction retardant content relative to 100 parts by mass of the polyol component is 0.05 parts by mass or more and 1.4 parts by mass or less.

The present invention [5] includes the polyurethane resin composition described in any one of the above-described [1] to [4], wherein the organic metal catalyst includes potassium salt.

The present invention [6] includes the polyurethane resin composition described in any one of the above-described [1] to [5], wherein the organic metal catalyst content relative to 100 parts by mass of the polyol component is 0.001 parts by mass or more and 10 parts by mass or less.

The present invention [7] includes the polyurethane resin composition described in any one of the above-described [1] to [6], wherein the polyisocyanate component further contains an alicyclic polyisocyanate, and in the polyisocyanate component, the ratio of the alicyclic polyisocyanate-derived isocyanate group relative to a total amount of the polyphenylmethane polyisocyanate-derived isocyanate group and the alicyclic polyisocyanate-derived isocyanate group is 10 mol % or more and 70 mol % or less.

The present invention [8] includes the polyurethane resin composition described in the above-described [1] to [7], wherein setting a total of the hydroxyl group of the polyol component as 100, a total of the isocyanate group of the polyisocyanate component relative to a total of the hydroxyl group of the polyol component is 75 or more and 400 or less.

The present invention [9] includes the polyurethane resin of a cured product of the polyurethane resin composition described in any one of the above-described [1] to [8].

The present invention [10] includes a molded article of the polyurethane resin described in [9] above.

The present invention [11] includes fiber reinforced plastic including fiber, and a cured product of the polyurethane resin composition described in any one of the above-described [1] to [8], wherein the fiber is impregnated with the polyurethane resin composition.

The present invention [12] includes the fiber reinforced plastic described in [11] above, wherein the fiber includes at least one selected from the group consisting of carbon fiber, glass fiber, and aramid fiber.

The present invention [13] includes a method for producing the fiber reinforced plastic described in [11] or [12] above, wherein the fiber reinforced plastic is produced by a molding method selected from the group consisting of RTM method, HP-RTM method, WCM method, and RIM method.

The present invention [14] includes the method for producing fiber reinforced plastic described in [13] above, wherein the molding temperature in the molding method is 25° C. or more and 250° C. or less.

The present invention [15] includes the method for producing fiber reinforced plastic described in [13] or [14] above, wherein the molding time in the molding method is 10 seconds or more and 5 minutes or less.

Effect of the Invention

With the polyurethane resin composition of the present invention, the mole ratio of the reaction retardant relative to 1 mol of the organic metal catalyst is the above-described lower limit or more, and therefore initial reaction between the polyisocyanate component containing polyphenylmethane polyisocyanate and the polyol component can be suppressed, and pot life of the polyurethane resin composition can be improved.

Furthermore, the reaction retardant is the compound represented by the above-described general formula (1), and the mole ratio of the reaction retardant relative to 1 mol of the organic metal catalyst is the above-described upper limit or less, and after passing the pot life (that is, after flowability of the polyurethane resin composition decreased), reaction between the polyisocyanate component and the polyol component can be allowed to progress smoothly, and curing time of the polyurethane resin composition can be decreased.

Therefore, the polyurethane resin composition can have well-balanced pot life and curing time, and it can be used suitably for production of polyurethane resin and a molded article.

The polyurethane resin of the present invention includes a cured product of the above-described polyurethane resin composition, and therefore it can be produced efficiently.

The molded article of the present invention includes the above-described polyurethane resin, and therefore it can be produced efficiently.

The fiber reinforced plastic of the present invention includes fiber and a cured product of the above-described polyurethane resin composition-impregnated fiber, and therefore mechanical strength can be improved, and it can be produced efficiently.

With the method for producing fiber reinforced plastic of the present invention, the fiber reinforced plastic is produced by RTM method, HP-RTM method, WCM method, and/or RIM method.

That is, the preformed fiber is disposed in a mold, and thereafter the above-described polyurethane resin composition is, for example, injected in the mold, thereby feeding it to the fiber in the mold.

At this time, the above-described polyurethane resin composition has improved pot life, and therefore it has sufficient flowability and smoothly impregnates the fiber in the mold.

The curing time for the above-described polyurethane resin composition is decreased, and therefore curing is completed with a relatively short period of time in the mold, and thereafter, the fiber reinforced plastic including fiber and a cured product of the polyurethane resin composition is demolded. That is, the fiber reinforced plastic can be demolded in a relatively short period of time, and therefore has excellent demoldability.

Therefore, the curing time for the polyurethane resin composition can be decreased, and the polyurethane resin composition can smoothly impregnate fiber, and the time necessary for production of the fiber reinforced plastic can be decreased. As a result, production efficiency of the fiber reinforced plastic can be improved.

Furthermore, the polyurethane resin composition can impregnate fiber smoothly, and therefore a fiber reinforced plastic molded article having excellent impact strength and surface glossiness originating from polyurethane resin, and having excellent surface roughness can be produced.

DESCRIPTION OF EMBODIMENTS

<Polyurethane Resin Composition>

The polyurethane resin composition of the present invention contains a polyisocyanate component, polyol component, organic metal catalyst, and a reaction retardant represented by general formula (1) below.

The polyisocyanate component contains at least polyphenylmethane polyisocyanate (p-MDI), and preferably, further contains a carbodiimide derivative of polyphenylmethane polyisocyanate.

The polyphenylmethane polyisocyanate is produced by a known method, to be specific, it is produced by phosgenation of, for example, polymericmethylene dianiline produced by condensation reaction of aniline and formalin. The polyphenylmethane polyisocyanate is also generally referred to as polymeric MDI, crude MDI, and polymethylene polyphenyl polyisocyanate.

Polyphenylmethane polyisocyanate generally contains diphenylmethane diisocyanate (monomer) and a condensate of diphenylmethane diisocyanate (oligomer, polymer). That is, polyphenylmethane polyisocyanate is a composition including diphenylmethane diisocyanate (MDI) and a condensate of diphenylmethane diisocyanate.

For diphenylmethane diisocyanate, for example, 4,4'-diphenylmethane diisocyanate, 2,4'-diphenylmethane diisocyanate, and 2,2'-diphenylmethane diisocyanate are used.

Polyphenylmethane polyisocyanate has an isocyanate group content (isocyanate group concentration) of, for example, 10 mass % or more, preferably 20 mass % or more, and for example, 50 mass % or less, preferably 40 mass % or less. The isocyanate group content can be measured by n-butylamine method according to JIS K-1603 (2007) using a potentiometric titrator (the same applies to the following).

When the polyisocyanate component contains another polyisocyanate (for example, carbodiimide derivative of polyphenylmethane polyisocyanate, etc.) in addition to polyphenylmethane polyisocyanate, the polyphenylmethane polyisocyanate content relative to a total amount of the polyisocyanate component is, for example, 10 mass % or more, preferably 30 mass % or more, and for example, 90 mass % or less, preferably 70 mass % or less.

The carbodiimide derivative of polyphenylmethane polyisocyanate is produced, for example, by subjecting the above-described polyphenylmethane polyisocyanate to decarboxylation condensation by a known method.

The carbodiimide derivative of the polyphenylmethane polyisocyanate contains, for example, carbodiimide derivative of diphenylmethane diisocyanate, and/or, a carbodiimide derivative of a condensate of diphenylmethane diisocyanate. That is, the carbodiimide derivative of polyphenylmethane polyisocyanate can consist of a carbodiimide derivative of diphenylmethane diisocyanate, or a carbodiimide derivative of a condensate of diphenylmethane diisocyanate, or it can be a composition containing a carbodiimide derivative of diphenylmethane diisocyanate and a carbodiimide derivative of a condensate of diphenylmethane diisocyanate.

The carbodiimide derivative of polyphenylmethane polyisocyanate has an isocyanate group content of, for example, 5 mass % or more, preferably 15 mass % or more, and for example, 45 mass % or less, preferably 35 mass % or less.

The carbodiimide derivative of polyphenylmethane polyisocyanate has a carbodiimide group-content of, for example, 10 mass % or more, preferably 20 mass % or more, and for example, 50 mass % or less, preferably 40 mass % or less. The carbodiimide group-content can be measured by $^{13}$C-NMR.

Relative to a total amount of the polyisocyanate component, the carbodiimide derivative of polyphenylmethane polyisocyanate is contained by, for example, 5 mass % or more, preferably 20 mass % or more, and for example, 70 mass % or less, preferably 60 mass % or less, more preferably 50 mass % or less.

The polyisocyanate component can further contain, as an optional component, alicyclic polyisocyanate.

That is, the polyisocyanate component can consist of polyphenylmethane polyisocyanate; or can consist of polyphenylmethane polyisocyanate and a carbodiimide derivative of polyphenylmethane polyisocyanate, or can consist of polyphenylmethane polyisocyanate and alicyclic polyisocyanate, or can consist of polyphenylmethane polyisocyanate, a carbodiimide derivative of polyphenylmethane polyisocyanate, and alicyclic polyisocyanate.

Examples of the alicyclic diisocyanate include 1,3-cyclopentanediisocyanate, 1,3-cyclopentene diisocyanate, cyclohexanediisocyanate (1,3- or 1,4-cyclohexanediisocyanate or a mixture thereof), 1,3- or 1,4-bis(isocyanatomethyl) cyclohexane or a mixture thereof ($H_6$XDI), 2,5- or 2,6-di(isocyanatomethyl) bicyclo[2.2.1]heptane or a mixture thereof (bis(isocyanatomethyl) norbornane, NBDI), 3-isocyanatomethyl-3,5,5-trimethylcyclohexylisocyanate (isophoronediisocyanate)(IPDI), methylenebis(cyclohexylisocyanate) (4,4'-, 2,4'- or 2,2'-methylenebis (cyclohexylisocyanate, their Trans, Trans-form, Trans, Cis-form, Cis, Cis-form, or a mixture thereof))($H_{12}$MDI), and methylcyclohexanediisocyanate (methyl-2,4-cyclohexanediisocyanate, methyl-2,6-cyclohexanediisocyanate). The alicyclic polyisocyanate can be used singly, or can be used in combination of two or more.

Of these alicyclic polyisocyanates, preferably, 1,3-bis(isocyanatomethyl) cyclohexane, 1,4-bis(isocyanatomethyl) cyclohexane, 2,5-di(isocyanatomethyl) bicyclo[2.2.1]heptane, 2,6-di(isocyanatomethyl) bicyclo[2.2.1]heptane, and isophoronediisocyanate are used, more preferably, 1,4-bis(isocyanatomethyl) cyclohexane (1,4-$H_6$XDI) is used.

The alicyclic polyisocyanate has an isocyanate group content of, for example, 20 mass % or more, preferably 30 mass % or more, and for example, 60 mass % or less, preferably 50 mass % or less.

The alicyclic polyisocyanate content relative to a total amount of the polyisocyanate component is, for example, 1 mass % or more, preferably 5 mass % or more, and for example, 40 mass % or less, preferably 25 mass % or less.

In the polyisocyanate component, the ratio of the alicyclic polyisocyanate-derived isocyanate group relative to a total amount of polyphenylmethane polyisocyanate-derived isocyanate group and alicyclic polyisocyanate-derived isocyanate group is, for example, 10 mol % or more, preferably 15 mol % or more, more preferably 20 mol % or more, and for example, 70 mol % or less, preferably 60 mol % or less, more preferably 50 mol % or less.

When the ratio of the alicyclic polyisocyanate-derived isocyanate group is within the above-described range, polyurethane resin and a molded article having suitable pot life, excellent compatibility with the polyisocyanate component and the polyol component, excellent mechanical properties and heat resistance, and also excellent heat resistance can be produced.

The ratio of the alicyclic polyisocyanate-derived isocyanate group relative to a total amount of the isocyanate group of the polyisocyanate component is, for example, 5 mol % or more, preferably 10 mol % or more, and for example, 60 mol % or less, preferably 40 mol % or less.

The reaction velocity of alicyclic polyisocyanate is slower than the reaction velocity of polyphenylmethane polyisocyanate and the reaction velocity of carbodiimide derivative of polyphenylmethane polyisocyanate.

Therefore, when the polyurethane resin composition contains alicyclic polyisocyanate, in the polyurethane resin composition, to stably ensure pot life and curing time with good balance, preferably, the ratio of the alicyclic polyisocyanate-derived isocyanate group relative to a total amount of hydroxyl group of the polyol component is adjusted to be in a predetermined range.

The ratio of the alicyclic polyisocyanate-derived isocyanate group relative to a total amount of hydroxyl group of the polyol component (NCO/OH) is, for example, 0.28 or more, preferably 0.30 or more, more preferably 0.35 or more, and for example, 0.5 or less, preferably 0.45 or less.

When the ratio of the alicyclic polyisocyanate-derived isocyanate group relative to a total of the hydroxyl group of the polyol component is the above-described lower limit or more, curing time for the polyurethane resin composition can be reliably decreased. When the ratio of the alicyclic polyisocyanate-derived isocyanate group relative to a total of the hydroxyl group of the polyol component is the above-described upper limit or less, pot life of the polyurethane resin composition can be reliably improved, and curing time for the polyurethane resin composition can be reliably reduced.

The ratio of a total amount of the isocyanate group of the polyisocyanate component relative to a total of the hydroxyl group of the polyol component (isocyanate index, (NCO/OH)×100) is, setting the total of the hydroxyl group of the polyol component as 100, for example, 75 or more, preferably 90 or more, more preferably 100 or more, and for example, 400 or less, preferably 300 or less, more preferably 250 or less.

For the polyol component, for example, a high molecular weight polyol and a low molecular-weight polyol are used. These polyol components can be used singly or in combination of two or more.

The high molecular weight polyol is a compound having two or more hydroxyl groups and a number average molecular weight of 500 or more and 10000 or less, and for example, the high molecular weight polyol described in paragraphs [0052] to [0067] of WO2017/014178 is used. The high molecular weight polyol can be used singly, or can be used in combination of two or more.

The low molecular-weight polyol is a compound having two or more hydroxyl groups and a number average molecular weight of 60 or more and less than 500, and for example, low molecular-weight polyol described in paragraphs [0068] to [0070] of WO2017/014178 is used. The low molecular-weight polyol can be used singly, or can be used in combination of two or more.

Of these examples of polyol component, preferably, a low molecular-weight polyol is used, more preferably, a low molecular-weight polyether polyol is used. That is, the polyol component preferably includes a low molecular-weight polyether polyol, more preferably, consists of a low molecular-weight polyether polyol.

To be specific, for the low molecular-weight polyether polyol, polyoxyalkylene (carbon atoms(C) 2 to 3) polyol, and polytetramethylene ether glycol are used.

The low molecular-weight polyetherpolyol can be used singly, or can be used in combination of two or more.

Polyoxyalkylene (C2 to 3) polyol is polyoxyalkylene polyol with alkyleneoxide having 2 to 3 carbon atoms, and for example, an addition polymerized product (including random and/or block copolymer of 2 or more alkylene oxides) of alkylene oxide such as ethyleneoxide and propyleneoxide using the above-described low molecular-weight polyol (for example, ethylene glycol, propylene glycol, bisphenol A, etc.) or a known low molecular-weight amine as the initiator is used.

To be specific, for polyoxyalkylene (C2 to 3) polyol, polyoxyethylene polyol, polyoxypropylene polyol, random and/or block copolymer of polyoxyethylene and polyoxypropylene, and polyoxypropylene bisphenol A ether are used. The functionality of the polyoxyalkylene (C2 to 3) polyol is determined by the functionality of the initiator.

Examples of the polytetramethylene ether glycol include ring-opening polymers obtained by cation polymerization of tetrahydrofuran and amorphous polytetramethylene ether glycols obtained by copolymerizing a polymerization unit of the tetrahydrofuran with a dihydric alcohol to be described later.

Of these examples of the low molecular-weight polyether polyol, preferably, polyoxyalkylene (C2 to 3) polyol is used.

The low molecular-weight polyether polyol has a number average molecular weight of, for example, 60 or more, preferably 100 or more, and for example, less than 500, preferably 400 or less.

The polyol component has an average functional group of, for example, 2.0 or more, and for example, 5.0 or less, preferably 4.0 or less. The polyol component has an average hydroxyl number of, for example, 300 mg KOH/g or more, preferably 350 mg KOH/g or more, and for example, 1200 mg KOH/g or less, preferably 1000 mg KOH/g or less, more preferably 600 mg KOH/g or less. The average functionality of the polyol component can be calculated from the charged component, and the average hydroxyl value can be obtained by a known titration method.

The organic metal catalyst is a known urethane-forming catalyst, and for example, an organotin compound, organic lead compound, organic nickel compound, organic copper compound, organic bismuth compound, and potassium salt are used. The organic metal catalyst can be used singly, or can be used in combination of two or more.

Examples of the organotin compound include tin acetate, tin octylate, tin oleate, tin laurylate, monobutyltin trioctate, dibutyltin diacetate, dimethyltin dilaurate, dibutyltin dilaurate, dibutyltin dimercaptide, dibutyltin maleate, dibutyltin dineodecanoate, dioctyltin dimercaptide, dioctyltin dilaurate, and dibutyltin dichloride.

For the organic lead compound, for example, lead octanoate and lead naphthenate are used. For the organic nickel compound, for example, nickel naphthenate is used. For the organic cobalt compound, for example, cobalt naphthenate is used. For the organic copper compound, for example, copper octenate is used. For the organic bismuth compound, for example, bismuth octylate, and bismuth neodecanoate are used.

For the potassium salt, for example, potassium carbonate, potassium acetate, and potassium octylate are used.

Of these examples of the organic metal catalyst, preferably, organotin compound and potassium salt are used, and more preferably, organotin compound and potassium salt are used in combination, further preferably, monobutyltin trioctate and potassium octylate are used in combination. That is, the organic metal catalyst preferably contains potassium salt.

When the organotin compound and potassium salt are used in combination, potassium salt content relative to 1 part by mass of the organotin compound is, for example, 1 part by mass or more, preferably 5 parts by mass or more, and for example, 30 parts by mass or less, preferably 20 parts by mass or less.

The organic metal catalyst (based on the amount of active component 100%) content relative to 100 parts by mass of the polyol component is, for example, 0.001 parts by mass or more, preferably 0.01 parts by mass or more, more preferably 0.1 parts by mass or more, and for example, 10 parts by mass or less, preferably 5 parts by mass or less, more preferably 3 parts by mass or less.

The reaction retardant is a heterocyclic compound represented by general formula (1) below.

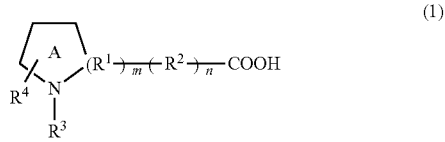

(1)

(in general formula (1), A represents aliphatic ring or aromatic ring. $R^1$ represents a hydrocarbon group composing ring A. $R^2$ represents an aliphatic hydrocarbon group bonded to ring A. $R^3$ represents a hydrogen atom or alkyl group bonded to nitrogen atom included in ring A provided that $R^3$ does not exist when ring A is a six-membered aromatic ring. $R^4$ represents a hydrogen atom or carboxyl group bonded to ring A. m is 1 or 2, n is 0 or 1, total of n and m is 2 or less.) In general formula (1), le represents a hydrocarbon group composing ring A and having 1 carbon atom, and to be specific, represents methylene group ($-CH_2-$) or methine group ($-CH=$). In general formula (1), m is 1 or 2.

Therefore, in general formula (1), when m is 1, A is 5-membered heteroaliphatic ring (pyrrolidine ring) or 5-membered heteroaromatic ring (pyrrole ring), and when m is 2, A is 6-membered heteroaliphatic ring (piperidine ring) or 6-membered heteroaromatic ring (pyridine ring).

In general formula (1), $R^2$ represents an aliphatic hydrocarbon group having one carbon atom and bonded to ring A, and to be specific, represents methylene group ($-CH_2-$). In general formula (1), $R^2$ is bonded to $R^1$, and $R^2$ is bonded to α position (2nd) or β position (3rd) of ring A. In general formula (1), n is 0 or 1, and total of n and m is 2 or less.

Therefore, in general formula (1), when n is 1, carboxyl group ($-COOH$) is bonded to ring A through the methylene group ($R^2$) bonded to carbon atom ($R^1$) at α position of ring A, and when n is 0, carboxyl group ($-COOH$) is bonded directly to the carbon atom ($R^1$) at α position or β position of ring A.

In general formula (1), $R^3$ represents hydrogen atom or alkyl group bonded to nitrogen atom included in ring A provided that $R^3$ does not exist when ring A is a six-membered aromatic ring. In general formula (1), the alkyl group represented as $R^3$ is, for example, alkyl group having 1 to 12 carbon atoms, and preferably, alkyl group having 1 to 4 carbon atoms (for example, methyl group, ethyl group, etc.) is used. In general formula (1), $R^3$ is preferably hydrogen atom.

In general formula (1), $R^4$ represents a hydrogen atom or carboxyl group bonded to ring A, and preferably represents hydrogen atom.

Examples of the reaction retardant represented by the above-described general formula (1) include, to be specific, the reaction retardant represented by general formula (2) below, nicotinic acid, 2,6-pyridinedicarboxylic acid, and proline. These examples of the reaction retardant represented by general formula (1) can be used singly, or can be used in combination of two or more.

Of these examples of the reaction retardant represented by general formula (1), preferably, reaction retardant represented by general formula (2) below is used.

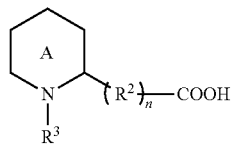

(2)

(in general formula (2), A, $R^2$, $R^3$, and n are the same as A, $R^2$, $R^3$, and n in the above-described general formula (1))
For the reaction retardant represented by the above-described general formula (2), to be specific, picolinic acid (in general formula (2), A:aromatic ring, $R^3$:absent, n=0), 2-pyridinyl acetic acid (in general formula (2), A:aromatic ring, $R^3$:absent, n=1), 2-piperidinecarboxylic acid (in general formula (2), A:aliphatic ring, $R^3$:hydrogen atom, n=1) are used. These examples of the reaction retardant represented by the above-described general formula (2) can be used singly, or can be used in combination of two or more.

Of these examples of the reaction retardant represented by the general formula (2), preferably, picolinic acid is used. That is, the reaction retardant preferably contains picolinic acid, more preferably, consists of picolinic acid.

The mole ratio of the reaction retardant relative to 1 mol of the organic metal catalyst is 0.50 or more, preferably 0.80 or more, more preferably 1.0 or more, 2.5 or less, preferably 2.0 or less.

When the organic metal catalyst contains potassium salt, the mole ratio of the reaction retardant relative to 1 mol of the potassium salt is, for example, 0.52 or more, preferably 0.9 or more, more preferably 1.1 or more, for example, 2.6 or less, preferably 2.1 or less.

When the mole ratio of the reaction retardant is the above-described lower limit or more, pot life of the polyurethane resin composition can be improved. When the mole ratio of the reaction retardant is the above-described upper limit or less, curing time for the polyurethane resin composition can be reduced.

The mole ratio of the reaction retardant relative to 1 mol of the isocyanate group of the polyisocyanate component is, for example, $0.1 \times 10^{-3}$ or more, preferably $1.0 \times 10^{-3}$ or more, more preferably $2.5 \times 10^{-3}$ or more, and for example, $7.0 \times 10^{-3}$ or less, preferably $5.0 \times 10^{-3}$ or less, more preferably $4.0 \times 10^{-3}$ or less.

The reaction retardant content relative to 100 parts by mass of the polyol component is, for example, 0.05 parts by mass or more, preferably 0.20 parts by mass or more, more preferably 0.50 parts by mass or more, and for example, 1.4 parts by mass or less, preferably 1.3 parts by mass or less, more preferably 1.0 parts by mass or less, even more preferably 0.8 parts by mass or less.

The polyurethane resin composition can further contain, as an optional component, a known additive at a suitable ratio.

Examples of the known additive include, for example, the additives described in paragraphs [0090] to [0138] and [0142] of WO2017/014178, and to be specific, a stabilizer, release agent, filler, impact absorption fine particles, hydrolysis inhibitor, dehydration agent, fire retardant, antifoaming agent, pigment, dye, lubricant, plasticizer, and blocking agent are used.

Such a polyurethane resin composition is composed as a two-component resin material of, for example, component A including a polyisocyanate component and component B including a polyol component. The organic metal catalyst, reaction retardant, and known additive can be contained in any of component A and component B, but preferably contained in component B.

In the polyurethane resin composition, the mole ratio of the reaction retardant relative to 1 mol of the organic metal catalyst is the above-described lower limit or more. Therefore, initial reaction between the polyisocyanate component containing polyphenylmethane polyisocyanate and the polyol component can be suppressed, and pot life of the polyurethane resin composition can be improved.

The reaction retardant is the compound represented by the above-described general formula (1), and the mole ratio of the reaction retardant relative to 1 mol of the organic metal catalyst is the above-described upper limit or less, and therefore after passing pot life (that is, after flowability of the polyurethane resin composition starts to decrease), reaction between the polyisocyanate component and polyol component can be smoothly progressed, and curing time for the polyurethane resin composition can be reduced.

Therefore, the polyurethane resin composition can have well-balanced pot life and curing time, and it can be suitably used for production of polyurethane resin and molded article.

<Polyurethane Resin>

To produce polyurethane resin, the polyisocyanate component is allowed to react with the polyol component (urethane-forming reaction), and the polyurethane resin composition is cured. That is, polyurethane resin includes a cured product of the polyurethane resin composition, and preferably consists of a cured product of the polyurethane resin composition.

Polyurethane resin can be produced by, for example, known methods such as one shot method and prepolymer method.

In the one shot method, for example, the polyisocyanate component is allowed to react with the polyol component at once.

The reaction temperature in the one shot method is, for example, 25° C. (room temperature) or more, preferably 35° C. or more, and for example, 250° C. or less, preferably 200° C. or less. The reaction time in the one shot method is, for example, 5 minutes or more, preferably 4 hours or more, and for example, 72 hours or less, preferably 24 hours or less.

In the prepolymer method, for example, first, the polyisocyanate component is allowed to react with a portion of the polyol component to synthesize an isocyanate group-terminated prepolymer having an isocyanate group at its molecular terminal. Then, the produced isocyanate group-terminated prepolymer is allowed to react with the remaining portion of the polyol component.

The reaction temperature in the synthesis of the isocyanate group-terminated prepolymer is, for example, 25° C. (room temperature) or more, preferably 50° C. or more, and for example, 150° C. or less, preferably 120° C. or less. The reaction time in the synthesis of the isocyanate group-terminated prepolymer is, for example, 0.5 hours or more, preferably 2 hours or more, and for example, 18 hours or less, preferably 10 hours or less.

The range of the reaction temperature for the isocyanate group-terminated prepolymer and polyol component is, for example, the same as the reaction temperature range for the one shot method, and the range of the reaction time for the isocyanate group-terminated prepolymer and polyol component is the same as the reaction time range of, for example, one shot method.

The polyurethane resin can be produced by a method such as, for example, bulk polymerization and solution polymerization.

The produced polyurethane resin has high rigidity and has a relatively high glass transition temperature, and excellent heat resistance. To be specific, the polyurethane resin has a glass transition temperature of, for example, 70° C. or more, preferably 90° C. or more, more preferably 110° C. or more, even more preferably 120° C. or more, and for example, 220° C. or less. The glass transition temperature can be measured by a known DSC measurement device.

The molded article is produced by a known method (for example, RIM method to be described later etc.) in which the polyurethane resin composition is cured and formed. Therefore, the molded article includes polyurethane resin.

To be specific, when the polyurethane resin composition is cured by one shot method, the polyisocyanate component (component A), and/or polyol component (component B) is preferably heated to decrease its viscosity and then mixed, and thereafter, as necessary, defoamed and then injected into a preheated mold.

When the polyurethane resin composition is cured by prepolymer method, the isocyanate group-terminated prepolymer, and/or polyol component (component B) is preferably heated to decrease its viscosity and then mixed, and thereafter, as necessary defoamed and then injected into a preheated mold.

The components (component A, component B, and isocyanate group-terminated prepolymer) of the polyurethane resin composition are heated at a temperature of, for example, 25° C. or more, preferably 35° C. or more, and for example, 150° C. or less, preferably 120° C. or less.

The mold is preheated to a temperature of, for example, 50° C. or more, preferably 60° C. or more, and for example, 200° C. or less, preferably 180° C. or less, more preferably 100° C. or less.

Thereafter, the polyurethane resin composition is allowed to react under the above-described reaction conditions, and then demolded.

The molded article having a predetermined form is produced in this manner. After demolding, the molded article can be aged as necessary at room temperature for about within 7 days.

As described above, the polyurethane resin and molded article are produced by curing the above-described polyurethane resin composition. Therefore, even if the polyurethane resin composition is heated to the above-described reaction temperature, flowability of the polyurethane resin composition can be secured until the pot life of the polyurethane resin composition passes. The polyurethane resin composition can be smoothly cured after passing of the pot life.

Therefore, the polyurethane resin and molded article can be produced efficiently.

<Fiber Reinforced Plastic>

Use of the above-described polyurethane resin and molded article is not particularly limited, but for example, they can be used for fiber reinforced plastic (FRP: Fiber Reinforced Plastics), plastic for structural material, and plastic for structural core material.

Of these examples of use, preferably, it is used for fiber reinforced plastic.

The fiber reinforced plastic is plastic reinforced by putting fiber inside polyurethane resin. It includes fiber and polyurethane resin (cured polyurethane resin composition) (the fiber impregnated with the polyurethane resin), and preferably, it consists of fiber and polyurethane resin.

Examples of the fiber include carbon fibers, glass fibers, aramid fibers, boron fibers, metal fibers, cellulose nanofibers, and artificial spider silk. The fiber can be used singly, or can be used in combination of two or more.

As the fiber, preferably carbon fibers, glass fibers, and aramid fibers are used. In other words, the fiber preferably consists of at least one selected from the group consisting of carbon fibers, glass fibers, and aramid fibers.

As the fiber, particularly preferably, carbon fibers are used.

The carbon fiber is not particularly limited, and examples thereof include pitch-type carbon fibers, PAN (polyacrylonitrile)-type carbon fibers, and rayon-type carbon fibers. The carbon fiber can be used singly, or can be used in combination of two or more.

As the carbon fibers, preferably, PAN (polyacrylonitrile)-type carbon fibers are used.

The embodiment of the fiber bundle is not particularly limited, and examples thereof include a large tow and a regular tow. The embodiment of the fiber is not particularly limited, and Examples thereof include a strip-form, a woven fabric-form (plain woven fabric, uniaxial woven fabric, multiaxial woven fabric, non-crimp woven fabric, or the like), and a non-woven fabric-form. Preferably, woven fabric is used. A plurality of sheets (for example, 2 to 20 sheets) of woven fiber on top of another can also be used.

In the fiber reinforced plastic, the fiber content based on volume is, for example, 20 volume % or more, preferably 30 volume % or more, and for example, 80% by volume or less, preferably 70% by volume or less.

<Method for Producing Fiber Reinforced Plastic>

Such fiber reinforced plastic is produced by, for example, impregnating the above-described fiber with the above-described polyurethane resin composition, and allowing the above-described polyurethane resin composition to cure.

Examples of the method for producing fiber reinforced plastic include RTM (Resin Transfer Molding) method, HP-RTM (High-Pressure Resin Transfer Molding) method, WCM (Wet Compression Molding) method, RIM (Reaction Injection Molding) method, prepreg method, a hand lay-up method, a filament winding method, and a pultrusion method.

Of these examples of the method for producing fiber reinforced plastic, preferably, RTM method, HP-RTM method, WCM method, and/or RIM method are used. That is, the fiber reinforced plastic is preferably produced by the RTM method, HP-RTM method, WCM method, and/or, RIM method. In other words, the fiber reinforced plastic is preferably produced by at least one molding method selected from the group consisting of RTM method, HP-RTM method, WCM method, and RIM method.

That is, the method for producing fiber reinforced plastic preferably includes steps of disposing fiber in a mold, supplying the above-described polyurethane resin composition to the fiber in the mold so as to impregnate the fiber with the polyurethane resin composition, and curing the polyurethane resin composition of the polyurethane resin composition-impregnated fiber.

In the RTM method and RIM method, the fiber that has been cut and formed in advance to the internal size of the mold is disposed in the mold, and the mold is heated to the above-described preheating temperature. Then, the polyisocyanate component (component A) and polyol component (component B) are mixed, and thereafter they are injected into the preheated mold, the fiber is impregnated with them, and they are cured under the above-described conditions.

In the HP-RTM method, in the above-described RTM method, the pressure is reduced in the mold, and a pressurized polyurethane resin composition (component A and component B) is injected into the mold with a high speed to impregnate the fiber, and cured under the above-described conditions. To be specific, the production method is described in Japanese Translation of PCT International Application Publication No. 2015-533352.

In the WCM method, in the above-described HP-RTM method, the mold is heated to the above-described preheating temperature, and then the fiber that has been cut and formed in advance to the internal size of mold is disposed in the mold, and thereafter, the fiber is impregnated with the mixed polyurethane resin composition (component A and component B) by applying (or dropping) the polyurethane resin composition thereon without reducing the internal pressure of the mold, and cured under the above-described conditions.

The molding temperature in these molding methods (RTM method, HP-RTM method, WCM method, and RIM method) is a temperature at which the polyurethane resin composition of the polyurethane resin composition-impregnated fiber is cured, and for example, 25° C. (room temperature) or more, preferably 35° C. or more, and for example, 250° C. or less, preferably 200° C. or less, more preferably 150° C. or less.

The molding time in the above-described molding method is the time required for curing the polyurethane resin composition of the polyurethane resin composition-impregnated fiber, and for example, 10 seconds or more, preferably 20 seconds or more, and for example, 5 minutes or less, preferably 3 minutes or less.

The fiber reinforced plastic is produced in the above-described manner.

Such fiber reinforced plastic includes the fiber, and cured product of the fiber impregnated with the above-described polyurethane resin composition, and therefore it improves mechanical strength, and it can be produced efficiently.

To be specific, the preformed fiber is disposed inside the mold, and thereafter the above-described polyurethane resin composition is injected into the mold preheated to the above-described preheating temperature. At this time, the polyurethane resin composition has improved pot life, and therefore even with the preheating temperature in the above-described range, it can have sufficient flowability in the mold, and the fiber is smoothly impregnated.

The curing time for the polyurethane resin composition is reduced, and therefore it is cured with a relatively short period of time in the mold, and thereafter, the fiber reinforced plastic including the fiber and polyurethane resin is demolded. That is, the fiber reinforced plastic can be demolded with a relatively short period of time, and therefore it has excellent demoldability.

Therefore, the fiber can be impregnated with the polyurethane resin composition smoothly, and the time required for producing the fiber reinforced plastic can be reduced. As a result, production efficiency of the fiber reinforced plastic can be improved.

Furthermore, the fiber can be impregnated with the polyurethane resin composition smoothly, and therefore a fiber reinforced plastic molded article with excellent impact strength and surface glossiness, and excellent surface roughness originated from polyurethane resin can be produced.

Such fiber reinforced plastic can be suitably used for, for example, members (for example, structural members, interior materials, exterior materials, wheels, spokes, and tables for seat, etc.) of vehicles (automobiles, aircrafts, motorcycles, bicycles).

In addition to the description above, for example, the fiber reinforced plastic is preferably used for outer shell materials for helmet, robot members, ship members, yacht members, rocket members, office chairs, health care members (nursing care artificial leg, nursing care chair, bed, eyewear frame, or the like), structural materials of wearable member, sports goods (shaft of golf club, tennis racket frame, ski board, snowboard, or the like), amusement members (roller coaster or the like), construction materials for building and housing, rolls for paper industry, casings for electronic component (smartphone, tablet, or the like), structures of power generator (thermal power generation, hydraulic power generation, wind power generation, nuclear power generation), and structures of tank lorry or the like.

EXAMPLES

The present invention is further described in detail based on EXAMPLES below. However, the present invention is not limited to Examples. The specific numerical values such as mixing ratio (content), physical property value, and parameter used in the following description can be replaced with upper limit values (numerical values defined with "or less" or "below") or lower limit values (numerical values defined with "or more" or "above") of corresponding numerical values in mixing ratio (content), physical property value, and parameter described in the above-described "DESCRIPTION OF EMBODIMENTS". All designations of "part" or "parts" and "%" are based on mass, unless otherwise particularly specified.

<Preparation of Materials>
<<Polyisocyanate Component Preparation>>

Preparation Example 1 (Isocyanate (1))

Trade name Cosmonate M-200 (manufactured by Mitsui Chemicals SKC polyurethane, polyphenylmethane polyisocyanate, isocyanate group content=31.2 mass %) was prepared as isocyanate (1).

Preparation Example 2 (Isocyanate (2))

Trade name Cosmonate LK (manufactured by Mitsui Chemicals SKC polyurethane, carbodiimide derivative of polyphenylmethane polyisocyanate, isocyanate group content=28.3 mass %, carbodiimide group-content=30 mass %) was prepared as isocyanate (2).

Preparation Example 3 (Isocyanate (3))

1,4-bis(isocyanatomethyl) cyclohexane produced by the method described in Production Example 3 of WO2009/051114 was prepared as isocyanate (3).
Isocyanate (3) had an isocyanate group content of 43.3 mass %.

<<Preparation of Polyol Component>>

Preparation Example 4 (Polyol (1))

Trade name ACTCOL Diol-280 (manufactured by Mitsui Chemicals SKC polyurethane, polyoxypropylenepolyol, number average molecular weight=281, hydroxyl number 400 mgKOH/g, average functional group=2, 25° C., viscosity=63 mPa·s) was prepared as polyol (1).

Preparation Example 5 (Polyol (2))

Trade name Uniol DB-400 (manufactured by NOF Corporation, polyoxypropylene bisphenol A ether) was prepared as polyol (2).

<<Preparation of Organic Metal Catalyst>>

Preparation Example 6 (Organic Metal Catalyst (1))

Trade name SCAT-24 (manufactured by Nitto Kasei Co., Ltd., monobutyltin trioctate, molecular weight=605.43, tin content=1.65 mmol/g) was prepared as organic metal catalyst (1).

Preparation Example 7 (Organic Metal Catalyst (2))

Trade name hexoate potassium 13% (manufactured by TOEI CHEMICAL INDUSTRY CO., LTD., potassium octylate, potassium content=3.3 mmol/g) was prepared as organic metal catalyst (2).

<<Preparation of Reaction Retardant>>

Preparation Example 8 (Reaction Retardant (1))

Picolinic acid (reaction retardant included in general formula (1)) was prepared as reaction retardant (1).

Preparation Example 9 (Reaction Retardant (2))

Nicotinic acid (reaction retardant included in general formula (1)) was prepared as reaction retardant (2).

Preparation Example 10 (Reaction Retardant (3))

2,6-pyridinedicarboxylic acid (reaction retardant included in general formula (1)) was prepared as reaction retardant (3).

Preparation Example 11 (Reaction Retardant (4))

2-pyridinyl acetic acid (reaction retardant included in general formula (1)) was prepared as reaction retardant (4).

Preparation Example 12 (Reaction Retardant (5))

2-piperidinecarboxylic acid (reaction retardant included in general formula (1)) was prepared as reaction retardant (5).

Preparation Example 13 (Reaction Retardant (6))

Proline (reaction retardant included in general formula (1)) was prepared as reaction retardant (6).

Preparation Example 14 (Reaction Retardant (7))

Trade name DP-4 (manufactured by DAIHACHI CHEMICAL INDUSTRY CO., LTD, acid phosphate butylester, other reaction retardant) was prepared as reaction retardant (7).

Preparation Example 15 (Reaction Retardant (8))

Isonicotinic acid (other reaction retardant) was prepared as reaction retardant (8).

Preparation Example 16 (Reaction Retardant (9))

2-pyridinepropionic acid (other reaction retardant) was prepared as reaction retardant (9).

Preparation Example 17 (Reaction Retardant (10))

4-piperidinecarboxylic acid (other reaction retardant) was prepared as reaction retardant (10).

Preparation Example 18 (Epoxy Component)

Trade name Epikote 807 (manufactured by Mitsubishi Chemical Corporation, bisphenol F epoxy resin) was prepared as epoxy component.

Preparation Example 19 (Epoxy Resin Curing Agent)

Trade name Jeffamine T-403 (manufactured by Huntsman International LLC., polyetheramine) was prepared as epoxy resin curing agent.

Preparation Example 20 (Carbon Fiber (1))

SIGRATEX C B300-45/ST (manufactured by SGL carbon, non-crimp fabric) was prepared as carbon fiber (1).

Preparation Example 21 (Carbon Fiber (2))

Trade name Besfight W-7161 (manufactured by Toho Tenax Co., Ltd., PAN carbon fiber, 12K twill) was prepared as carbon fiber (2).

<Production of Polyurethane Resin and Fiber Reinforced Plastic>

Examples 1 to 33 and Comparative Examples 1 to 8, 12 to 17

The polyurethane resin composition was prepared by the following method. Tables 1 to 7 describe the amount of each component.

The amount of each component other than the polyisocyanate component and carbon fiber of those component (material) shown in Tables 1 to 7 are weighed, and they are stirred and mixed homogenously according to the mixing formulation shown in Tables 1 to 7, thereby preparing component B. The temperature of component B was adjusted to 40° C.

A separately prepared polyisocyanate component was weighed in accordance with the mixing formulation shown in Tables 1 to 7, and they were stirred and mixed homogenously, thereby preparing component A. The temperature of component A was adjusted to 40° C.

Thereafter, component A was added to component B, and they are stirred for five seconds with a high-speed stirrer (number of revolutions of 5000 rpm), while the air thereof was removed by vacuum reduced pressure, thereby preparing a polyurethane resin composition.

The polyurethane resin composition was quickly put in a one-side opening mold (thickness 2 mm, depth 100 mm, width 300 mm) preheated to 90° C., and cured at 90° C. for 180 seconds, thereby preparing polyurethane resin (molded article, thickness 2 mm, length 100 mm, width 300 mm).

In Examples 7, 17, 18, 20, and 21, carbon fiber shown in Table 1 and Table 4 was placed in the one-side opening mold, thereby preparing fiber reinforced plastic.

Comparative Examples 9 to 11

Epoxy resin was produced in the same manner as in Example 1, except that the epoxy resin composition was prepared by changing the component A to epoxy resin curing agent and component B to epoxy component in accordance with the formulation shown in Table 4, and the preheating temperature of the mold and the molding temperature were changed as shown in Table 4.

In Comparative Example 11, carbon fiber shown in Table 4 was placed in the one-side opening mold, thereby producing fiber reinforced plastic.

<Evaluation>

Evaluation was conducted for Examples 1 to 33 and Comparative Examples 1 to 17 as follows.

<<Pot Life (Seconds)>>

Pot life of the above-described polyurethane resin composition and epoxy resin composition was measured. The results are shown in Tables 1 to 7.

The polyurethane resin composition or epoxy resin composition was put into a poly cup of 100 mL, and the viscosity of the polyurethane composition or epoxy component was measured with type B viscometer.

The pot life measurement was started the moment when the component A (polyisocyanate component or epoxy resin curing agent) and component B (Polyol component or epoxy component) were mixed.

The measurement of pot life was terminated when the viscosity of the polyurethane resin composition (or epoxy resin composition) started to increase due to reaction between the polyol component and isocyanate component (or reaction between epoxy resin curing agent and epoxy component), and the flowability started to decrease (the time when 500 mPa·s was passed with type B viscometer). The amount of the components blended is described in Table 1 to Table 7.

<<180 Seconds Demoldability>>

180 seconds demoldability of the above-described polyurethane resin and epoxy resin was evaluated by the following method. The results are shown in Tables 1 to 7.

The polyurethane resin composition or epoxy resin composition was put into the above-described one-side opening mold, and cured at 90° C. (140° C. in Comparative Examples 10 and 11) for 180 seconds, and then the cured product (polyurethane resin or epoxy resin) was taken out from the mold, and the conditions of the cured product at that time were observed visually.

GOOD: Completely cured and no uncured portion.

Fair: No uncured portion seen but insufficient curing and occurrence of warping and bending.

Bad: Uncured liquid resin portion or attached resin at internal surface of mold was seen.

<<Bending Physical Property>>

Bending strength and bending modulus of elasticity of fiber reinforced plastic were measured in accordance with JIS K 7074. The results are shown in Table 4.

<<Puncture Test>>

Puncture test that shows impact strength of fiber reinforced plastic was conducted based on JIS K 7211-2, and maximum impact energy and puncture energy were measured. The results are shown in Table 4.

<<Surface Glossiness>>

Specular glossiness of the fiber reinforced plastic was measured in accordance with JIS Z8741. The results are shown in Table 4.

<<Surface Roughness>>

Ra and Rz defined in JIS B0601 were measured using a stylus-contact surface roughness measuring instrument (manufactured by TOKYO SEIMITSU CO., LTD., product name SURFCOM 1400D), and surface roughness (Ra/Rz) was calculated. The results are shown in Table 4.

TABLE 1

| | Component | | Trade name or compound name | Ex. 1 | Ex. 2 | Ex. 3 | Ex. 4 | Ex. 5 | Ex. 6 | Ex. 7 |
|---|---|---|---|---|---|---|---|---|---|---|
| Mixing formulation [parts by mass] | Polyisocyanate component | Isocyanate (1) | Cosmonate M-200 | 102.6 | 102.6 | 102.6 | 102.6 | 102.6 | 102.6 | 102.6 |
| | | Isocyanate (2) | Cosmonate LK | 67.8 | 67.8 | 67.8 | 67.8 | 67.8 | 67.8 | 67.8 |
| | | Isocyanate (3) | 1,4-H$_8$XDI | 29.6 | 29.6 | 29.6 | 29.6 | 29.6 | 29.6 | 29.6 |

TABLE 1-continued

|  |  |  | Trade name or | No. | | | | | | |
|---|---|---|---|---|---|---|---|---|---|---|
| Component | | | compound name | Ex. 1 | Ex. 2 | Ex. 3 | Ex. 4 | Ex. 5 | Ex. 6 | Ex. 7 |
| | Polyol component [parts by mass] | Polyol (1) | Diol-280 | 100 | 100 | 100 | 100 | 100 | 100 | 100 |
| | Organic metal catalyst [parts by mass] | Catalyst (1) | SCAT-24 | 0.1 | 0.1 | 0.1 | 0.1 | 0.1 | 0.1 | 0.1 |
| | | Catalyst (2) | Hexoate potassium 13% | 1.0 | 1.0 | 1.0 | 1.0 | 2.0 | 0.1 | 1.0 |
| Reaction retardant | Reaction retardant included in general formula (1) [parts by mass] | Retardant (1) | Picolinic acid | 0.4 | 0.6 | 0.7 | 1.0 | 1.2 | 0.06 | 0.6 |
| | | Retardant (2) | Nicotinic acid | — | — | — | — | — | — | — |
| | | Retardant (3) | 2,6-Pyridinedicarboxylic acid | — | — | — | — | — | — | — |
| | | Retardant (4) | 2-Pyridinyl acetic acid | — | — | — | — | — | — | — |
| | | Retardant (5) | 2-Piperidinecarboxylic acid | — | — | — | — | — | — | — |
| | | Retardant (6) | Proline | — | — | — | — | — | — | — |
| | Other reaction retardant [parts by mass] | Retardant (7) | DP-4 | — | — | — | — | — | — | — |
| | | Retardent (8) | Isonicotinic acid | — | — | — | — | — | — | — |
| | | Retardant (9) | 2-Pyridinepropionic acid | — | — | — | — | — | — | — |
| | | Retardant (10) | 4-Piperidinecarboxylic acid | — | — | — | — | — | — | — |
| | Fiber [Vf (%)] | Carbon fiber (1) | B300-45/ST | — | — | — | — | — | — | 50 |
| Organic metal catalyst in mole | | Catalyst (1) | [mmol] | 0.165 | 0.165 | 0.165 | 0.165 | 0.165 | 0.165 | 0.165 |
| | | Catalyst (2) | [mmol] | 3.3 | 3.3 | 3.3 | 3.3 | 6.6 | 0.33 | 3.3 |
| | | Total | [mmol] | 3.47 | 3.47 | 3.47 | 3.47 | 6.77 | 0.50 | 3.47 |
| Reaction retardant in mole | | | [mmol] | 3.24 | 4.88 | 5.67 | 8.10 | 9.72 | 0.49 | 4.86 |
| Reaction retardant/Catalyst (2) | | | [—] | 0.98 | 1.47 | 1.72 | 2.46 | 1.47 | 1.47 | 1.47 |
| Reaction retardant/Organic metal catalyst | | | [—] | 0.94 | 1.40 | 1.64 | 2.34 | 1.44 | 0.96 | 1.40 |
| Isocyanate index ((NCO/OH) × 100) | | | | 213 | 213 | 213 | 213 | 213 | 213 | 213 |
| Evaluation | | | Pot life (gel time) | 20 | 25 | 32 | 40 | 29 | 24 | — |
| | | | 180 seconds demoldability | Good | Good | Good | Fair | Good | Good | Good |

TABLE 2

|  |  |  | Trade name or | No. | | | | |
|---|---|---|---|---|---|---|---|---|
| Component | | | compound name | EX. 8 | Ex. 9 | Ex. 10 | Ex. 11 | Ex. 12 |
| Mixing formulation | Polyisocyanate component [parts by mass] | Isocyanate (1) | Cosmonate M-200 | 95.1 | 95.1 | 71.8 | 112.8 | 102.6 |
| | | Isocyanate (2) | Cosmonate LK | 104.9 | 104.9 | 47.5 | 74.6 | 67.8 |
| | | Isocyanate (3) | 1,4-H₈XDI | — | — | 20.7 | 32.5 | 29.6 |
| | Polyol component [parts by mass] | Polyol (1) | Diol-280 | 100 | 100 | 100 | 100 | 100 |
| | Organic metal catalyst [parts by mass] | Catalyst (1) | SCAT-24 | 0.1 | 0.1 | 0.1 | 0.1 | 0.1 |
| | | Catalyst (2) | Hexoate potassium 13% | 1.0 | 1.0 | 1.0 | 1.0 | 1.0 |
| Reaction retardant | Reaction retardant included in general formula (1) [parts by mass] | Retardant (1) | Picolinic acid | 0.6 | 0.8 | 0.6 | 0.6 | — |
| | | Retardant (2) | Nicotinic acid | — | — | — | — | 0.4 |
| | | Retardant (3) | 2,6-Pyridinedicarboxylic acid | — | — | — | — | — |
| | | Retardant (4) | 2-Pyridinyl acetic acid | — | — | — | — | — |
| | | Retardant (5) | 2-Piperidinecarboxylic acid | — | — | — | — | — |
| | | Retardant (6) | Proline | — | — | — | — | — |
| | Other reaction retardant [parts by mass] | Retardant (7) | DP-4 | — | — | — | — | — |
| | | Retardant (8) | Isonicotinic acid | — | — | — | — | — |
| | | Retardant (9) | 2-Pyridinepropionic acid | — | — | — | — | — |
| | | Retardant (10) | 4-Piperidinecarboxylic acid | — | — | — | — | — |
| | Fiber [Vf (%)] | Carbon fiber (1) | B300-45/ST | — | — | — | — | — |
| Organic metal catalyst in mole | | Catalyst (1) | [mmol] | 0.185 | 0.165 | 0.165 | 0.165 | 0.165 |
| | | Catalyst (2) | [mmol] | 3.3 | 3.3 | 3.3 | 3.3 | 3.3 |
| | | Total | [mmol] | 3.47 | 3.47 | 3.47 | 3.47 | 3.47 |
| Reaction retardant in mole | | | [mmol] | 4.86 | 6.48 | 4.86 | 4.86 | 3.24 |
| Reaction retardant/Catalyst (2) | | | [—] | 1.47 | 1.96 | 1.47 | 1.47 | 0.98 |

TABLE 2-continued

| | | | | | | |
|---|---|---|---|---|---|---|
| Reaction retardant/Organic metal catalyst | | [—] | 1.40 | 1.87 | 1.40 | 1.40 | 0.94 |
| Isocyanate index ((NCO/OH) × 100) | | | 198 | 198 | 149 | 234 | 213 |
| Evaluation | Pot life (gel time) | | 20 | 28 | 29 | 21 | 24 |
| | 180 seconds demoldability | | Good | Good | Fair | Good | Good |

| | | | Trade name or | No. | | | |
|---|---|---|---|---|---|---|---|
| | Component | | compound name | Ex. 13 | Ex. 14 | Ex. 15 | Ex. 16 |
| Mixing formulation | Polyisocyanate component [parts by mass] | | Isocyanate (1) | Cosmonate M-200 | 102.6 | 102.6 | 102.6 | 102.6 |
| | | | Isocyanate (2) | Cosmonate LK | 67.8 | 67.8 | 67.8 | 67.8 |
| | | | Isocyanate (3) | 1,4-H₈XDI | 29.6 | 29.6 | 29.6 | 29.6 |
| | Polyol component [parts by mass] | | Polyol (1) | Diol-280 | 100 | 100 | 100 | 100 |
| | Organic metal catalyst [parts by mass] | | Catalyst (1) | SCAT-24 | 0.1 | 0.1 | 0.1 | 0.1 |
| | | | Catalyst (2) | Hexoate potassium 13% | 1.0 | 1.0 | 1.0 | 1.0 |
| | Reaction retardant | Reaction retardant included in general formula (1) [parts by mass] | Retardant (1) | Picolinic acid | — | — | — | — |
| | | | Retardant (2) | Nicotinic acid | — | — | — | — |
| | | | Retardant (3) | 2,6-Pyridinedicarboxylic acid | 0.3 | — | — | — |
| | | | Retardant (4) | 2-Pyridinyl acetic acid | — | 0.6 | — | — |
| | | | Retardant (5) | 2-Piperidinecarboxylic acid | — | — | 0.6 | — |
| | | | Retardant (6) | Proline | — | — | — | 0.5 |
| | | Other reaction retardant [parts by mass] | Retardant (7) | DP-4 | — | — | — | — |
| | | | Retardent (8) | Isonicotinic acid | — | — | — | — |
| | | | Retardant (9) | 2-Pyridinepropionic acid | — | — | — | — |
| | | | Retardant (10) | 4-Piperidinecarboxylic acid | — | — | — | — |
| | Fiber [Vf (%)] | | Carbon fiber (1) | B300-45/ST | — | — | — | — |
| Organic metal catalyst in mole | | | Catalyst (1) | [mmol] | 0.165 | 0.165 | 0.185 | 0.165 |
| | | | Catalyst (2) | [mmol] | 3.3 | 3.3 | 3.3 | 3.3 |
| | | | Total | [mmol] | 3.47 | 3.47 | 3.47 | 3.47 |
| Reaction retardant in mole | | | | [mmol] | 1.80 | 4.36 | 4.65 | 4.34 |
| Reaction retardant/Catalyst (2) | | | | [—] | 0.54 | 1.33 | 1.41 | 1.32 |
| Reaction retardant/Organic metal catalyst | | | | [—] | 0.52 | 1.26 | 1.34 | 1.25 |
| Isocyanate index ((NCO/OH) × 100) | | | | | 213 | 213 | 213 | 213 |
| Evaluation | | | Pot life (gel time) | | 31 | 30 | 28 | 29 |
| | | | 180 seconds demoldability | | Good | Good | Good | Good |

TABLE 3

| | | | Trade name or | No. | | | |
|---|---|---|---|---|---|---|---|
| | Component | | compound name | Comp. Ex. 1 | Comp. Ex. 2 | Comp. Ex. 3 | Comp. Ex. 4 |
| Mixing formulation | Polyisocyanate component [parts by mass] | | Isocyanate (1) | Cosmonate M-200 | 102.6 | 102.6 | 102.6 | 102.6 |
| | | | Isocyanate (2) | Cosmonate LK | 67.8 | 67.8 | 67.8 | 67.8 |
| | | | Isocyanate (3) | 1,4-H₈XDI | 29.6 | 29.6 | 29.6 | 29.6 |
| | Polyol component [parts by mass] | | Polyol (1) | Diol-280 | 100 | 100 | 100 | 100 |
| | Organic metal catalyst [parts by mass] | | Catalyst (1) | SCAT-24 | 0.1 | 0.1 | 0.1 | 0.1 |
| | | | Catalyst (2) | Hexoate potassium 13% | 1.0 | 1.0 | 1.0 | 1.0 |
| | Reaction retardant | Reaction retardant included in general formula (1) [parts by mass] | Retardant (1) | Picolinic acid | — | 0.05 | 0.1 | 1.5 |
| | | | Retardant (2) | Nicotinic acid | — | — | — | — |
| | | | Retardant (3) | 2,6-Pyridinedicarboxylic acid | — | — | — | — |
| | | | Retardant (4) | 2-Pyridinyl acetic acid | — | — | — | — |
| | | | Retardant (5) | 2-Piperidinecarboxylic acid | — | — | — | — |
| | | | Retardant (6) | Proline | — | — | — | — |
| | | Other reaction retardant [parts by mass] | Retardant (7) | DP-4 | — | — | — | — |
| | | | Retardent (8) | Isonicotinic acid | — | — | — | — |
| | | | Retardant (9) | 2-Pyridinepropionic acid | — | — | — | — |
| | | | Retardant (10) | 4-Piperidinecarboxylic acid | — | — | — | — |
| | Fiber [Vf (%)] | | Carbon fiber (1) | B300-45/ST | — | — | — | — |
| Organic metal catalyst in mole | | | Catalyst (1) | [mmol] | 0.165 | 0.165 | 0.165 | 0.165 |
| | | | Catalyst (2) | [mmol] | 3.3 | 3.3 | 3.3 | 3.3 |
| | | | Total | [mmol] | 3.47 | 3.47 | 3.47 | 3.47 |
| Reaction retardant in mole | | | | [mmol] | — | 0.41 | 0.81 | 12.18 |
| Reaction retardant/Catalyst (2) | | | | [—] | — | 0.12 | 0.25 | 3.68 |
| Reaction retardant/Organic metal catalyst | | | | [—] | — | 0.12 | 0.23 | 3.51 |
| Isocyanate index ((NCO/OH) × 100) | | | | | 213 | 213 | 213 | 213 |
| Evaluation | | | Pot life (gel time) | | 3 | 5 | 10 | 60 |
| | | | 180 seconds demoldability | | Good | Good | Good | Bad |

TABLE 3-continued

| | Component | | Trade name or compound name | Comp. Ex. 5 | Comp. Ex. 6 | Comp. Ex. 7 | Comp. Ex. 8 |
|---|---|---|---|---|---|---|---|
| Mixing formulation [parts by mass] | Polyisocyanate component | Isocyanate (1) | Cosmonate M-200 | 102.6 | 102.6 | 102.6 | 102.6 |
| | | Isocyanate (2) | Cosmonate LK | 67.8 | 67.8 | 67.8 | 67.8 |
| | | Isocyanate (3) | 1,4-H$_8$XDI | 29.6 | 29.6 | 29.6 | 29.6 |
| Polyol component [parts by mass] | | Polyol (1) | Diol-280 | 100 | 100 | 100 | 100 |
| Organic metal catalyst [parts by mass] | | Catalyst (1) | SCAT-24 | 0.1 | 0.1 | 0.1 | 0.1 |
| | | Catalyst (2) | Hexoate potassium 13% | 1.0 | 1.0 | 1.0 | 1.0 |
| Reaction retardant | Reaction retardant included in general formula (1) [parts by mass] | Retardant (1) | Picolinic acid | — | — | — | — |
| | | Retardant (2) | Nicotinic acid | — | — | — | — |
| | | Retardant (3) | 2,6-Pyridinedicarboxylic acid | — | — | — | — |
| | | Retardant (4) | 2-Pyridinyl acetic acid | — | — | — | — |
| | | Retardant (5) | 2-Piperidinecarboxylic acid | — | — | — | — |
| | | Retardant (6) | Proline | — | — | — | — |
| | Other reaction retardant [parts by mass] | Retardant (7) | DP-4 | 0.4 | — | — | — |
| | | Retardent (8) | Isonicotinic acid | — | 0.6 | — | — |
| | | Retardant (9) | 2-Pyridinepropionic acid | — | — | 0.7 | — |
| | | Retardant (10) | 4-Piperidinecarboxylic acid | — | — | — | 0.5 |
| | Fiber [Vf (%)] | Carbon fiber (1) | B300-45/ST | — | — | — | — |
| Organic metal catalyst in mole | | Catalyst (1) | [mmol] | 0.165 | 0.165 | 0.165 | 0.165 |
| | | Catalyst (2) | [mmol] | 3.3 | 3.3 | 3.3 | 3.3 |
| | | Total | [mmol] | 3.47 | 3.47 | 3.47 | 3.47 |
| Reaction retardant in mole | | | [mmol] | 2.08 | 4.88 | 4.63 | 3.87 |
| Reaction retardant/Catalyst (2) | | | [—] | 0.62 | 1.48 | 1.40 | 1.17 |
| Reaction retardant/Organic metal catalyst | | | [—] | 0.59 | 1.41 | 1.34 | 1.12 |
| Isocyanate index ((NCO/OH) × 100) | | | | 213 | 213 | 213 | 213 |
| Evaluation | | | Pot life (gel time) | 32 | 27 | 31 | 29 |
| | | | 180 seconds demoldability | Bad | Bad | Bad | Bad |

TABLE 4

| | Component | | Trade name or compound name | Ex. 17 | Comp. EX. 9 | Comp. Ex. 10 | Comp. Ex. 11 | Ex. 18 | Ex. 19 | Ex. 20 | Ex. 21 |
|---|---|---|---|---|---|---|---|---|---|---|---|
| Mixing formulation [parts by mass] | Polyisocyanate component | Isocyanate (1) | Cosmonate M-200 | 95.1 | — | — | — | 95.1 | 76.1 | 76.1 | 76.1 |
| | | Isocyanate (2) | Cosmonate LK | 104.9 | — | — | — | 104.9 | 83.9 | 83.9 | 83.9 |
| | | Isocyanate (3) | 1,4-H$_8$XDI | — | — | — | — | — | — | — | — |
| | Polyol component [parts by mass] | Polyol (1) | Diol-280 | 100 | — | — | — | 100 | 50 | 50 | 50 |
| | | Polyol (2) | DB-400 | — | — | — | — | — | 50 | 50 | 50 |
| | Organic metal catalyst [parts by mass] | Catalyst (1) | SCAT-24 | 0.1 | — | — | — | 0.1 | 0.1 | 0.1 | 0.1 |
| | | Catalyst (2) | Hexoate potassium 13% | 1.0 | — | — | — | 1.0 | 1.0 | 1.0 | 1.0 |
| | Reaction retardant [parts by mass] | Retardant (1) | Picolinic acid | 0.6 | — | — | — | 0.6 | 0.6 | 0.6 | 0.6 |
| | Epoxy component [parts by mass] | | Epikote 807 | — | 100 | 100 | 100 | — | — | — | — |
| | Epoxy resin curing agent [parts by mass] | | T-403 | — | 45 | 45 | 45 | — | — | — | — |
| | Fiber [Vf (%)] | Carbon fiber (1) | B300-45/ST | 50 | — | — | 50 | — | — | 50 | — |
| | | Carbon fiber (2) | W-7161 | — | — | — | — | 46 | — | — | 46 |
| Organic metal catalyst in mole | | Catalyst (1) | [mmol] | 0.165 | — | — | — | 0.165 | 0.165 | 0.165 | 0.165 |
| | | Catalyst (2) | [mmol] | 3.3 | — | — | — | 3.3 | 3.3 | 3.3 | 3.3 |
| | | Total | [mmol] | 3.47 | — | — | — | 3.47 | 3.47 | 3.47 | 3.47 |
| Reaction retardant in mole | | | [mmol] | 4.86 | — | — | — | 4.86 | 4.86 | 4.86 | 4.86 |
| Reaction retardant/Catalyst (2) | | | [—] | 1.47 | — | — | — | 1.47 | 1.47 | 1.47 | 1.47 |
| Reaction retardant/Organic metal catalyst | | | [—] | 1.40 | — | — | — | 1.40 | 1.40 | 1.40 | 1.40 |
| Isocyanate index ((NCO/OH) × 100) | | | | 198 | — | — | — | 198 | 183 | 183 | 183 |

TABLE 4-continued

| | Component | Trade name or compound name | Ex. 17 | Comp. EX. 9 | Comp. Ex. 10 | Comp. Ex. 11 | Ex. 18 | Ex. 19 | Ex. 20 | Ex. 21 |
|---|---|---|---|---|---|---|---|---|---|---|
| Mold temperature | | [° C.] | 90 | 90 | 140 | 140 | 90 | 90 | 90 | 90 |
| Evaluation | Pot life (gel time) | | — | 150 | 10 | — | — | 22 | — | — |
| | 180 seconds demoldability | | Good | Bad | Good | Good | Good | Good | Good | Good |
| | Bending strength | [MPa] | 670 | — | — | 640 | 501 | — | 680 | 614 |
| | Bending modulus of elasticity | [GPa] | 34 | — | — | 33 | 41 | — | 33 | 42 |
| | Maximum impact energy | [J] | 9 | — | — | 7.5 | 11.5 | — | 9.9 | 12 |
| | Puncture energy | [J] | 34.2 | — | — | 24.7 | 37.6 | — | 37.1 | 37 |
| | Surface glossiness | [%] | 84.5 | — | — | 20.7 | 83 | — | 74 | 88 |
| | Surface roughness (Ra/Rz) | [μm] | 0.69/ 2.85 | — | — | 1.54/ 7.24 | 0.83/ 3.7 | — | 0.67/ 3.17 | 0.55/ 2.29 |

TABLE 5

| | | | Trade name or compound name | Ex. 22 | Ex. 23 | Ex. 24 | Ex. 25 | Ex. 26 | Ex. 27 | Ex. 28 |
|---|---|---|---|---|---|---|---|---|---|---|
| Mixing formulation | Polyisocyanate component [parts by mass] | Isocyanate (1) | Cosmonate M-200 | 61.5 | 128.2 | 95.1 | 95.1 | 95.1 | 57.1 | 118.9 |
| | | Isocyanate (2) | Cosmonate LK | 40.7 | 84.8 | 104.9 | 104.9 | 104.9 | 62.9 | 131.1 |
| | | Isocyanate (3) | 1,4-H$_8$XDI | 17.8 | 37.0 | — | — | — | — | — |
| | Polyol component [parts by mass] | Polyol (1) | Diol-280 | 100 | 100 | 100 | 100 | 100 | 100 | 100 |
| | Organic metal catalyst [parts by mass] | Catalyst (1) | SCAT-24 | 0.1 | 0.1 | 0.1 | 0.1 | 0.1 | 0.1 | 0.1 |
| | | Catalyst (2) | Hexoate potassium 13% | 1.0 | 1.0 | 1.0 | 1.0 | 2.0 | 0.1 | 1.0 |
| | Reaction retardant | Reaction retardant included in general formula (1) [parts by mass] | Retardant (1) | Picolinic acid | 0.25 | 1.0 | 0.4 | 1.0 | 1.2 | 0.3 | 1.0 |
| | | | Retardant (2) | Nicotinic acid | — | — | — | — | — | — | — |
| | | | Retardant (3) | 2,6-Pyridinedicarboxylic acid | — | — | — | — | — | — | — |
| | | | Retardant (4) | 2-Pyridinyl acetic acid | — | — | — | — | — | — | — |
| | | | Retardant (5) | 2-Piperidinecarboxylic acid | — | — | — | — | — | — | — |
| | | | Retardant (6) | Proline | — | — | — | — | — | — | — |
| | | Other reaction retardant [parts by mass] | Retardant (7) | DP-4 | — | — | — | — | — | — | — |
| | | | Retardent (8) | Isonicotinic acid | — | — | — | — | — | — | — |
| | | | Retardant (9) | 2-Pyridinepropionic acid | — | — | — | — | — | — | — |
| | | | Retardant (10) | 4-Piperidinecarboxylic acid | — | — | — | — | — | — | — |
| | Fiber [Vf (%)] | | Carbon fiber (1) | B300-45/ST | — | — | — | — | — | — | — |
| Organic metal catalyst in mole | | Catalyst (1) | [mmol] | 0.165 | 0.165 | 0.165 | 0.165 | 0.165 | 0.165 | 0.165 |
| | | Catalyst (2) | [mmol] | 3.3 | 3.3 | 3.3 | 3.3 | 6.6 | 3.3 | 3.3 |
| | | Total | [mmol] | 3.47 | 3.47 | 3.47 | 3.47 | 6.77 | 3.47 | 3.47 |
| Reaction retardant in mole | | | [mmol] | 2.02 | 8.10 | 3.24 | 8.10 | 9.72 | 2.43 | 8.10 |
| Reaction retardant/Catalyst (2) | | | [—] | 0.61 | 2.46 | 0.98 | 2.46 | 1.47 | 0.74 | 2.46 |
| Reaction retardant/Organic metal catalyst | | | [—] | 0.58 | 2.34 | 0.94 | 2.34 | 1.44 | 0.70 | 2.34 |
| Isocyanate index ((NCO/OH) × 100) | | | | 128 | 266 | 198 | 198 | 198 | 119 | 247 |
| Evaluation | | Pot life (gel time) | | 30 | 18 | 16 | 35 | 22 | 29 | 16 |
| | | 180 seconds demoldability | | Fair | Good | Good | Good | Good | Good | Good |

TABLE 6

| | Component | | Trade name or compound name | Ex. 29 | Ex. 30 | Ex. 31 | Ex. 32 | Ex. 33 |
|---|---|---|---|---|---|---|---|---|
| Mixing formulation | Polyisocyanate component [parts by mass] | Isocyanate (1) | Cosmonate M-200 | 95.1 | 95.1 | 95.1 | 95.1 | 95.1 |
| | | Isocyanate (2) | Cosmonate LK | 104.9 | 104.9 | 104.9 | 104.9 | 104.9 |
| | | Isocyanate (3) | 1,4-H$_8$XDI | — | — | — | — | — |
| | Polyol component [parts by mass] | Polyol (1) | Diol-280 | 100 | 100 | 100 | 100 | 100 |
| | Organic metal catalyst [parts by mass] | Catalyst (1) | SCAT-24 | 0.1 | 0.1 | 0.1 | 0.1 | 0.1 |
| | | Catalyst (2) | Hexoate potassium 13% | 1.0 | 1.0 | 1.0 | 1.0 | 1.0 |
| | Reaction retardant | Reaction retardant included in general formula (1) [parts by mass] | Retardant (1) Picolinic acid | — | — | — | — | — |
| | | | Retardant (2) Nicotinic acid | 0.4 | — | — | — | — |
| | | | Retardant (3) 2,6-Pyridinedicarboxylic acid | — | 0.3 | — | — | — |
| | | | Retardant (4) 2-Pyridinyl acetic acid | — | — | 0.6 | — | — |
| | | | Retardant (5) 2-Piperidinecarboxylic acid | — | — | — | 0.6 | — |
| | | | Retardant (6) Proline | — | — | — | — | 0.5 |
| | | Other reaction retardant [parts by mass] | Retardant (7) DP-4 | — | — | — | — | — |
| | | | Retardent (8) Isonicotinic acid | — | — | — | — | — |
| | | | Retardant (9) 2-Pyridinepropionic acid | — | — | — | — | — |
| | | | Retardant (10) 4-Piperidinecarboxylic acid | — | — | — | — | — |
| | Fiber [Vf (%)] | Carbon fiber (1) | B300-45/ST | — | — | — | — | — |
| Organic metal catalyst in mole | | Catalyst (1) | [mmol] | 0.165 | 0.165 | 0.165 | 0.165 | 0.165 |
| | | Catalyst (2) | [mmol] | 3.3 | 3.3 | 3.3 | 3.3 | 3.3 |
| | | Total | [mmol] | 3.47 | 3.47 | 3.47 | 3.47 | 3.47 |
| Reaction retardant in mole | | | [mmol] | 3.24 | 1.80 | 4.38 | 4.65 | 4.34 |
| Reaction retardant/Catalyst (2) | | | [—] | 0.98 | 0.54 | 1.33 | 1.41 | 1.32 |
| Reaction retardant/Organic metal catalyst | | | [—] | 0.94 | 0.52 | 1.26 | 1.34 | 1.25 |
| Isocyanate index ((NCO/OH) × 100) | | | | 198 | 198 | 198 | 198 | 198 |
| Evaluation | | | Pot life (gel time) | 19 | 25 | 25 | 24 | 23 |
| | | | 180 seconds demoldability | Good | Good | Good | Good | Good |

TABLE 7

| | Component | | Trade name or compound name | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|---|
| Mixing formulation | Polyisocyanate component [parts by mass] | Isocyanate (1) | Cosmonate M-200 | 95.1 | 95.1 | 95.1 | 95.1 | 95.1 | 95.1 |
| | | Isocyanate (2) | Cosmonate LK | 104.9 | 104.9 | 104.9 | 104.9 | 104.9 | 104.9 |
| | | Isocyanate (3) | 1,4-H$_8$XDI | — | — | — | — | — | — |
| | Polyol component [parts by mass] | Polyol (1) | Diol-280 | 100 | 100 | 100 | 100 | 100 | 100 |
| | Organic metal catalyst [parts by mass] | Catalyst (1) | SCAT-24 | 0.1 | 0.1 | 0.1 | 0.1 | 0.1 | 0.1 |
| | | Catalyst (2) | Hexoate potassium 13% | 1.0 | 1.0 | 1.0 | 1.0 | 1.0 | 0.1 |
| | Reaction retardant | Reaction retardant included in general formula (1) [parts by mass] | Retardant (1) Picolinic acid | 0.1 | 1.5 | — | — | — | — |
| | | | Retardant (2) Nicotinic acid | — | — | | | | |
| | | | Retardant (3) 2,6-Pyridinedicarboxylic acid | | | | | | |

TABLE 7-continued

|  | Component | Trade name or compound name | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|
|  | Retardant (4) | 2-Pyridinyl acetic acid | — | — | — | — | — | — |
|  | Retardant (5) | 2-Piperidinecarboxylic acid | — | — | — | — | — | — |
|  | Retardant (6) | Proline | — | — | — | — | — | — |
| Other reaction retardant [parts by mass] | Retardant (7) | DP-4 | — | — | 0.4 | — | — | — |
|  | Retardent (8) | Isonicotinic acid | — | — | — | 0.6 | — | — |
|  | Retardant (9) | 2-Pyridinepropionic acid | — | — | — | — | 0.7 | — |
|  | Retardant (10) | 4-Piperidinecarboxylic acid | — | — | — | — | — | 0.5 |
| Fiber [Vf (%)] | Carbon fiber (1) | B300-45/ST | — | — | — | — | — | — |
| Organic metal catalyst in mole | Catalyst (1) | [mmol] | 0.165 | 0.165 | 0.165 | 0.165 | 0.165 | 0.165 |
|  | Catalyst (2) | [mmol] | 3.3 | 3.3 | 3.3 | 3.3 | 3.3 | 3.3 |
|  | Total | [mmol] | 3.47 | 3.47 | 3.47 | 3.47 | 3.47 | 3.47 |
| Reaction retardant in mole |  | [mmol] | 0.81 | 12.16 | 2.06 | 4.88 | 4.63 | 3.87 |
| Reaction retardant/Catalyst (2) |  | [—] | 0.25 | 3.68 | 0.62 | 1.48 | 1.40 | 1.17 |
| Reaction retardant/Organic metal catalyst |  | [—] | 0.23 | 3.51 | 0.59 | 1.41 | 1.34 | 1.12 |
| Isocyanate index ((NCO/OH) × 100) |  |  | 198 | 198 | 198 | 198 | 198 | 198 |
| Evaluation |  | Pot life (gel time) | 6 | 55 | 24 | 21 | 23 | 21 |
|  |  | 180 seconds demoldability | Good | Bad | Bad | Bad | Bad | Bad |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

Industrial Applicability

The polyurethane resin composition of the present invention can be suitably used, for example, as industrial materials for various industries such as materials for polyurethane resin. The polyurethane resin and molded article of the present invention are suitably used for, for example, fiber reinforced plastic, plastic for structural materials, and plastic for structural core materials. The fiber reinforced plastic of the present invention is suitably used for, for example, various industrial products such as members of vehicles. The method for producing fiber reinforced plastic of the present invention is suitably used for production of various industrial products.

The invention claimed is:

1. A polyurethane resin composition comprising:
a polyisocyanate component containing polyphenylmethane polyisocyanate,
a polyol component,
an organic metal catalyst, and
a reaction retardant represented by general formula (1), general formula (2), general formula (3), general formula (4), or general formula (5) below, wherein
the mole ratio of the reaction retardant relative to 1 mol of the organic metal catalyst is 0.50 or more and 2.50 or less,

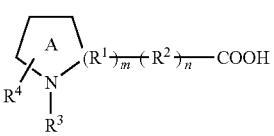
(1)

in general formula (1), A represents an aliphatic ring or aromatic ring, $R^1$ represents a hydrocarbon group included in ring A and having 1 carbon atom, $R^2$ represents an aliphatic hydrocarbon group having 1 carbon atom, $R^3$ represents a hydrogen atom or alkyl group bonded to nitrogen atom included in ring A when ring A is an aliphatic ring, and represents a hydrogen atom when ring A is an aromatic ring, $R^4$ represents a hydrogen atom or carboxyl group bonded to ring A, m is 1, n is 0 or 1, and —COOH is bonded to ring A through $R^2$ bonded to $R^1$ at a position of ring A when n is 1, and is bonded directly to $R^1$ at a position of ring A when n is 0;

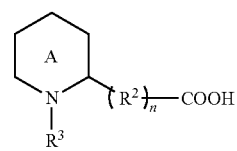
(2)

in general formula (2), A represents an aliphatic ring or aromatic ring, $R^2$ is the same as $R^2$ in general formula (1), $R^3$ represents a hydrogen atom or alkyl group bonded to nitrogen atom included in ring A when ring A is an aliphatic ring, $R^3$ does not exist when ring A is an aromatic ring, n is 0, and —COOH is bonded directly to ring A;

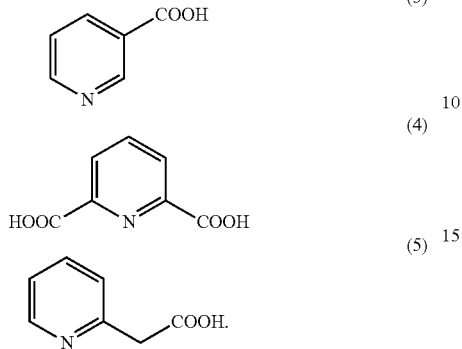

2. The polyurethane resin composition according to claim 1, wherein
the reaction retardant is picolinic acid.

3. The polyurethane resin composition according to claim 1, wherein
the reaction retardant content relative to 100 parts by mass of the polyol component is 0.05 parts by mass or more and 1.4 parts by mass or less.

4. The polyurethane resin composition according to claim 1, wherein
the organic metal catalyst includes potassium salt.

5. The polyurethane resin composition according to claim 1, wherein
the organic metal catalyst content relative to 100 parts by mass of the polyol component is 0.001 parts by mass or more and 10 parts by mass or less.

6. The polyurethane resin composition according to claim 1, wherein
the polyisocyanate component further contains alicyclic polyisocyanate,
and in the polyisocyanate component, the ratio of the alicyclic polyisocyanate-derived isocyanate group relative to a total amount of the polyphenylmethane polyisocyanate-derived isocyanate group and the alicyclic polyisocyanate-derived isocyanate group is 10 mol % or more and 70 mol % or less.

7. The polyurethane resin composition according to claim 1, wherein
setting a total of the hydroxyl group of the polyol component as 100, the ratio of a total of the isocyanate group of the polyisocyanate component relative to a total of the hydroxyl group of the polyol component is 75 or more and 400 or less.

8. Polyurethane resin comprising a cured product of the polyurethane resin composition according to claim 1.

9. A molded article including the polyurethane resin according to claim 8.

10. Fiber reinforced plastic comprising:
fiber, and
a cured product of the polyurethane resin composition according to claim 1, wherein the fiber is impregnated with the polyurethane resin composition.

11. The fiber reinforced plastic according to claim 10, wherein
the fiber comprises at least one selected from the group consisting of carbon fiber, glass fiber, and aramid fiber.

12. A method for producing the fiber reinforced plastic according to claim 10, wherein
the fiber reinforced plastic is produced by a molding method selected from the group consisting of Resin Transfer Molding method, High-Pressure Resin Transfer Molding method, Wet Compression Molding method, and Reaction Injection Molding method.

13. The method for producing fiber reinforced plastic according to claim 12, wherein
the molding temperature in the molding method is 25° C. or more and 250° C. or less.

14. The method for producing fiber reinforced plastic according to claim 12, wherein
the molding time for the molding method is 10 seconds or more and 5 minutes or less.

15. The polyurethane resin composition according to claim 1, wherein
in formulae (1) and (2), the alkyl group represented as $R^3$ has 1 to 12 carbon atoms.

16. The polyurethane resin composition according to claim 1, wherein
in formulae (1) and (2), the alkyl group represented as $R^3$ has 1 to 4 carbon atoms.

* * * * *